United States Patent
Imanishi et al.

(10) Patent No.: US 12,431,732 B2
(45) Date of Patent: Sep. 30, 2025

(54) UNINTERRUPTIBLE POWER SUPPLY APPARATUS

(71) Applicant: TOSHIBA MITSUBISHI-ELECTRIC INDUSTRIAL SYSTEMS CORPORATION, Chuo-ku (JP)

(72) Inventors: Ryogo Imanishi, Tokyo (JP); Yousuke Hayashi, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 552 days.

(21) Appl. No.: 17/999,075

(22) PCT Filed: Apr. 16, 2021

(86) PCT No.: PCT/JP2021/015715
§ 371 (c)(1),
(2) Date: Nov. 17, 2022

(87) PCT Pub. No.: WO2022/219805
PCT Pub. Date: Oct. 20, 2022

(65) Prior Publication Data
US 2023/0208185 A1   Jun. 29, 2023

(51) Int. Cl.
*H02J 7/00* (2006.01)
*H02J 7/14* (2006.01)
*H02J 9/06* (2006.01)

(52) U.S. Cl.
CPC ............................ *H02J 9/062* (2013.01)

(58) Field of Classification Search
CPC .... H02J 9/00; H02J 9/062; H02J 9/063; H02J 9/068

(Continued)

(56) References Cited

U.S. PATENT DOCUMENTS 9,160,202 B2 * 10/2015 Colombi ............... H02J 3/0073
2015/0061392 A1 * 3/2015 Berard ...................... H02J 3/46
307/52

(Continued)

FOREIGN PATENT DOCUMENTS

| CN | 107394789 A | 11/2017 |
| JP | 2014-53986 A | 3/2014 |
| JP | 2020-195174 A | 12/2020 |

OTHER PUBLICATIONS

International Search Report mailed on Jul. 6, 2021 in PCT/JP2021/015715 filed on Apr. 16, 2021 (2 pages).

(Continued)

*Primary Examiner* — Alexis B Pacheco
(74) *Attorney, Agent, or Firm* — Oblon, McClelland, Maier & Neustadt, L.L.P.

(57) ABSTRACT

An uninterruptible power supply apparatus having a plurality of power conversion modules and a bypass module connected in parallel between an AC power supply and a load. Each of the power conversion modules includes a first terminal that receives AC power from the AC power supply, a second terminal connected to a power storage device, a third terminal for outputting AC power to the load, a converter, an inverter, and a first control circuit. The bypass module includes a switch connected between the AC power supply and the load, a first voltage detector that detects an AC voltage applied to the first terminal, a second voltage detector that detects a DC voltage applied to the second terminal, a third voltage detector that detects an AC voltage applied to the third terminal, and a second control circuit.

6 Claims, 4 Drawing Sheets

(58) Field of Classification Search
USPC .......................................................... 320/132
See application file for complete search history.

(56) References Cited

U.S. PATENT DOCUMENTS

| | | | |
|---|---|---|---|
| 2015/0076916 A1* | 3/2015 | Cheng ................. | H02M 5/4585 307/64 |
| 2015/0244210 A1* | 8/2015 | Kolhatkar ............... | H02M 5/42 307/23 |
| 2016/0033978 A1* | 2/2016 | Giuntini ................ | H02M 7/493 307/31 |
| 2016/0181861 A1* | 6/2016 | Familiant .............. | H02J 7/0048 307/66 |
| 2018/0152046 A1* | 5/2018 | Toyoda ................... | H02J 9/062 |

OTHER PUBLICATIONS

Indian Office Action issued Apr. 2, 2025 in Indian Patent Application No. 202217068345, 5 pages.

* cited by examiner

UNINTERRUPTIBLE POWER SUPPLY APPARATUS

TECHNICAL FIELD

The present disclosure relates to an uninterruptible power supply apparatus.

BACKGROUND ART

A high-capacity uninterruptible power supply system includes a plurality of uninterruptible power supply apparatuses connected in parallel to achieve redundancy, whereby even if one of the uninterruptible power supply apparatuses fails or is being inspected, the remaining uninterruptible power supply apparatuses can continue to supply power to a load (see Japanese Patent Laying-Open No. 2020-195174 (PTL1), for example).

A low- or medium-capacity uninterruptible power supply system, on the other hand, is often configured as a single uninterruptible power supply apparatus. For this reason, a configuration employing a modular uninterruptible power supply apparatus that achieves redundancy on a module-by-module basis has been proposed for this single uninterruptible power supply apparatus. The modular uninterruptible power supply apparatus includes a plurality of power conversion modules (hereinafter also referred to as "power modules") connected in parallel, to thereby have a parallel circuit of power modules in the apparatus. When N power modules are required for power supply by an uninterruptible power supply apparatus, (N+1) power modules are mounted to achieve redundancy, whereby the quality of the power supply can be improved.

CITATION LIST

Patent Literature

PTL 1: Japanese Patent Laying-Open No. 2020-195174

SUMMARY OF INVENTION

Technical Problem

The modular uninterruptible power supply apparatus described above employs a hot swap method. The hot swap method means a structure that allows a power module to be stopped, and this power module to be removed and inserted, during operation of the uninterruptible power supply apparatus. According to this method, a power module can be replaced while power feed by the uninterruptible power supply apparatus is continued at the time of failure or inspection of the power module.

To implement hot swap, each power module contains a plurality of detectors to detect voltages and currents that are input to/output from a built-in power converter, in order to control the power converter. Thus, the number of detectors increases in proportion to the number of power modules. This raises a concern that the size and cost of the uninterruptible power supply apparatus may increase.

In addition, because the operation of the power converter is controlled using detected values from the detectors for each power module, there is a concern that operation variation in the power converter may occur among the plurality of power modules due to such factors as detection errors of the detectors. In this case, a phenomenon in which power flows among the plurality of power modules (that is, a cross current) may occur.

The present disclosure has been made to solve the problems as described above, and has an object to achieve size and cost reductions of a modular uninterruptible power supply apparatus including a plurality of power modules connected in parallel, and to suppress operation variation among the plurality of power modules.

Solution to Problem

An uninterruptible power supply apparatus according to an aspect of the present disclosure includes a plurality of power conversion modules connected in parallel between an AC power supply and a load, and a bypass module connected between the AC power supply and the load. The plurality of power conversion modules are connected in parallel with a power storage device. Each of the power conversion modules includes a first terminal that receives AC power from the AC power supply, a second terminal connected to the power storage device, a third terminal for outputting AC power to the load, a converter that converts AC power received by the first terminal into DC power, an inverter that converts DC power from the converter or the power storage device into AC power and supplies the AC power to the load, and a first control circuit that controls the converter and the inverter. The bypass module includes a switch connected between the AC power supply and the load, a first voltage detector that detects an AC voltage received by the first terminal, a second voltage detector that detects a DC voltage received by the second terminal, a third voltage detector that detects an AC voltage output to the third terminal, and a second control circuit that controls ON/OFF of the switch. The second control circuit is communicatively connected to the first control circuit, and transmits detection results from the first to third voltage detectors to the first control circuit. The first control circuit controls the converter and the inverter by using the detection results from the first to third voltage detectors that are transmitted from the second control circuit.

Advantageous Effects of Invention

The present disclosure can achieve size and cost reductions of a modular uninterruptible power supply apparatus including a plurality of power modules connected in parallel, and can suppress operation variation among the plurality of power modules.

DESCRIPTION OF EMBODIMENTS

Figure 1:
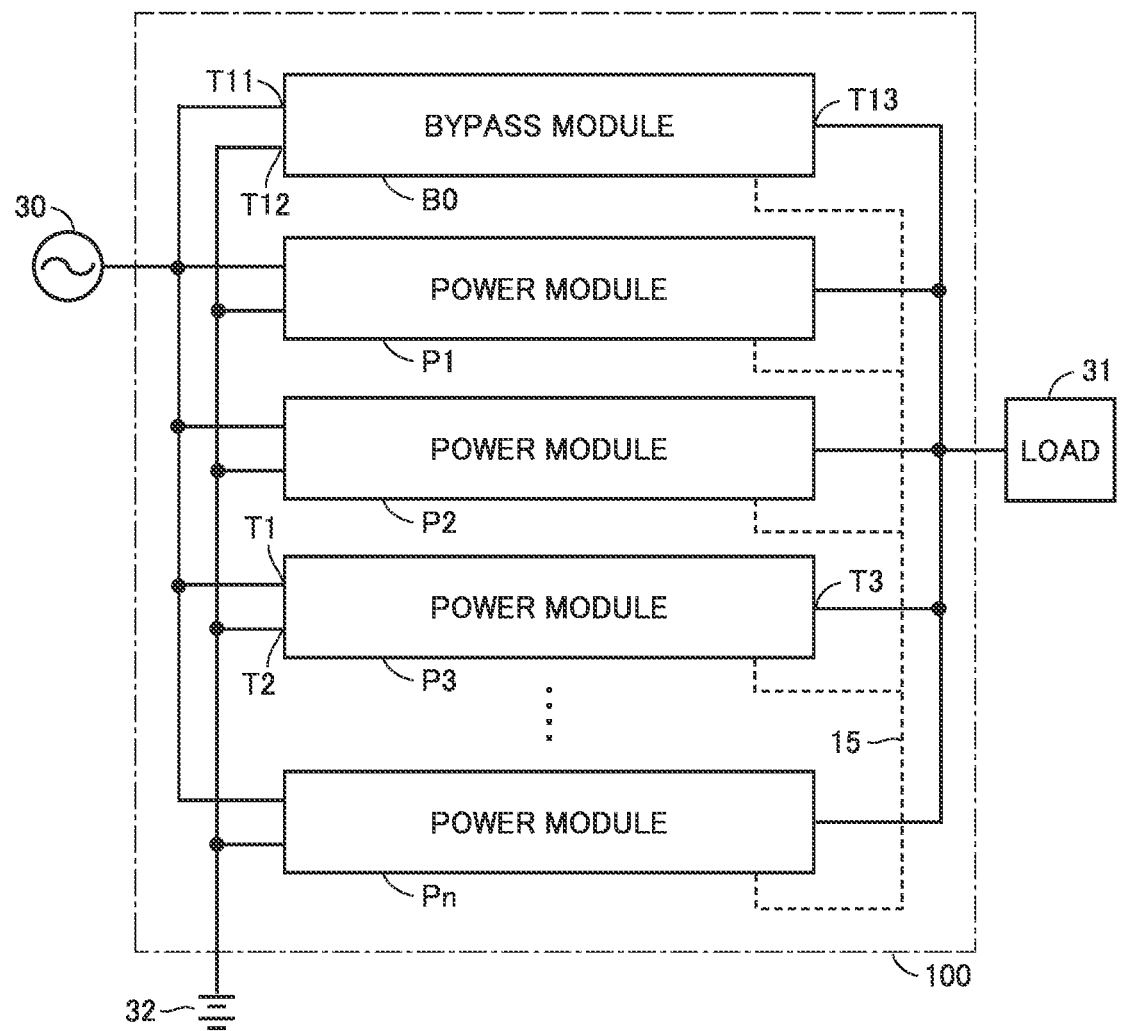
FIG. 1 is a circuit block diagram showing a configuration of an uninterruptible power supply apparatus according to an embodiment.

An embodiment of the present disclosure is described hereinafter in detail with reference to the drawings. In the following, the same or corresponding parts in the drawings are denoted by the same reference characters, and a description thereof is not repeated in principle.

FIG. 1 is a circuit block diagram showing a configuration of an uninterruptible power supply apparatus according to an embodiment.

Referring to FIG. 1, an uninterruptible power supply apparatus 100 according to the present embodiment includes a bypass module B0, a plurality of power modules P1 to Pn (n is an integer greater than or equal to 2), a battery 32, and a communication line 15. Bypass module B0 and power modules P1 to Pn are connected to each other by communication line 15.

Bypass module B0 has an input terminal T11, a battery terminal T12, an output terminal T13, and a switch (not shown) connected between input terminal T11 and output terminal T13.

Each of power modules P1 to Pn is a power conversion module having a converter and an inverter. In the following description, power modules P1 to Pn may be collectively referred to as a "power module P." Power module P has an input terminal T1, a battery terminal T2, and an output terminal T3. Input terminal T1 corresponds to a "first terminal," battery terminal T2 corresponds to a "second terminal," and output terminal T3 corresponds to a "third terminal."

Input terminal T11 of bypass module B0 and input terminal T1 of each power module P are both connected to a commercial AC power supply 30. Input terminal T11 and each input terminal T1 receive an AC voltage VI with a commercial frequency supplied from commercial AC power supply 30.

Battery terminal T12 of bypass module B0 and battery terminal T2 of each power module P are both connected to battery 32. Battery 32 stores DC power. Battery 32 corresponds to an embodiment of "power storage device." Instead of battery 32, a capacitor may be connected.

Output terminal T13 of bypass module B0 and output terminal T3 of each power module P are both connected to a load 31. That is, bypass module B0 and power modules P1 to Pn are connected in parallel with each other between commercial AC power supply 30 and load 31. Load 31 is driven by AC power supplied from bypass module B0 or power module P.

Such an uninterruptible power supply apparatus is referred to as a "modular uninterruptible power supply apparatus." A modular uninterruptible power supply apparatus has an internal parallel circuit of a number of power modules corresponding to the capacity of the uninterruptible power supply apparatus. When N power modules are required for power supply by an uninterruptible power supply apparatus, (N+1) power modules are mounted to achieve redundancy, whereby the quality of the power supply can be improved. A method for achieving redundancy on a module-by-module basis in a single uninterruptible power supply apparatus in this manner is also referred to as a "hot swap method." The hot swap method means a structure that allows a power module to be stopped, and this power module to be removed and inserted, during operation of the uninterruptible power supply apparatus. According to this method, power module P can be replaced while power feed by the uninterruptible power supply apparatus is continued at the time of failure or inspection of the power module.

Uninterruptible power supply apparatus 100 has an inverter power feed mode and a bypass power feed mode. The inverter power feed mode is a mode in which AC power is supplied from power module P to load 31. In the inverter power feed mode, AC power supplied from commercial AC power supply 30 is converted into DC power by the converter of power module P, and further, the DC power is converted into AC power by the inverter and the AC power is supplied to load 31. The bypass power feed mode is a mode in which AC power is supplied from commercial AC power supply 30 to load 31 through bypass module B0. In the bypass power feed mode, AC power supplied from commercial AC power supply 30 is supplied to load 31 without passing through power module P.

Figure 2:
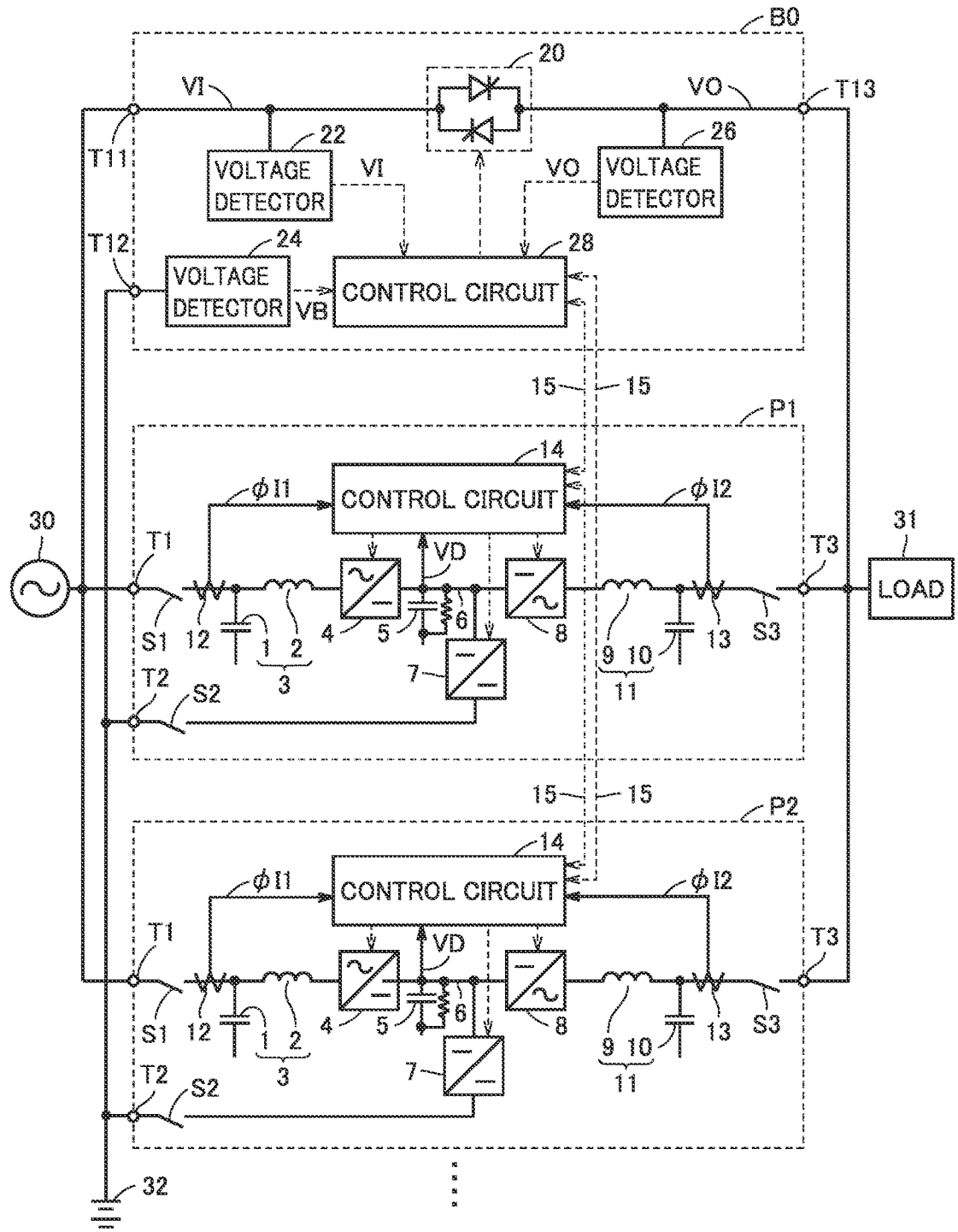
FIG. 2 is a circuit block diagram showing configurations of a bypass module and power modules shown in FIG. 1.

FIG. 2 is a circuit block diagram showing configurations of bypass module B0 and power modules P shown in FIG. 1. Uninterruptible power supply apparatus 100 converts three-phase AC power from commercial AC power supply 30 into DC power, and further, converts the DC power into three-phase AC power and supplies the three-phase AC power to load 31. FIG. 2 shows only a circuit corresponding to one of three phases (U-phase, V-phase and W-phase) in order to simplify the illustration and description.

As shown in FIG. 2, bypass module B0 has a switch 20, voltage detectors 22, 24 and 26, and a control circuit 28. Switch 20 is connected between input terminal T11 and output terminal T13. Switch 20 is, for example, a thyristor switch having a pair of thyristors connected in anti-parallel. Switch 20 is controlled by control circuit 28. Switch 20 is turned off in the inverter power feed mode, and is turned on in the bypass power feed mode. Control circuit 28 corresponds to an embodiment of "second control circuit."

Voltage detector 22 detects an instantaneous value of AC voltage (AC voltage applied to input terminal T1) VI with a commercial frequency supplied from commercial AC power supply 30, and provides a signal indicating the detected value to control circuit 28.

Voltage detector 24 detects a terminal-to-terminal voltage (hereinafter also referred to as a "battery voltage") VB of battery 32 applied to battery terminal T12, and provides a signal indicating the detected value to control circuit 28.

Voltage detector 26 detects an instantaneous value of an AC voltage VO applied to output terminal T13, and provides a signal indicating the detected value to control circuit 28.

Control circuit 28 receives the signals indicating the detected values of AC voltage VI, battery voltage VB and AC voltage VO from voltage detectors 22, 24 and 26, respectively. Control circuit 28 is connected to control circuits 14 included in power modules P1 to Pn by communication line 15. Control circuit 28 exchanges information with control circuits 14 of power modules P1 to Pn through communication line 15. The communication between control circuit 28 and control circuits 14 may be implemented as either wireless or wired communication. Control circuit 28 transmits the signals indicating the detected values of AC voltage VI, battery voltage VB and AC voltage VO to control circuits 14 included in power modules P1 to Pn through communication line 15.

Control circuit 28 can be configured as a microcomputer, for example. As an example, control circuit 28 contains a memory and a CPU (Central Processing Unit), which are not shown in the figure, and can perform control operations described below by software processing in which the CPU executes a program prestored in the memory. Alternatively, some or all of the control operations can be implemented by hardware processing using built-in dedicated electronic circuitry and the like, instead of by the software processing.

In addition to input terminal T1, battery terminal T2 and output terminal T3, power module P has switches S1 to S3, capacitors 1, 5 and 10, reactors 2 and 9, a DC line 6, a converter 4, a bidirectional chopper 7, an inverter 8, current detectors 12 and 13, and control circuit 14.

Input terminal T1 receives AC voltage VI with a commercial frequency from commercial AC power supply 30. Switch S1 has a first terminal connected to input terminal T1, and a second terminal connected to an input node of converter 4 through reactor 2. Capacitor 1 is connected to the second terminal of switch S1. Switch S1 is turned on when a corresponding power module P is in use, and is turned off during maintenance of power module P, for example.

Capacitor 1 and reactor 2 constitute an AC filter 3. AC filter 3 is a low pass filter, allows an AC current with a commercial frequency to flow from commercial AC power supply 30 to converter 4, and prevents a signal with a switching frequency generated at converter 4 from flowing toward commercial AC power supply 30.

Current detector 12 detects a current I1 flowing into power module P from commercial AC power supply 30 through input terminal T1, and provides a signal φI1 indicating the detected value to control circuit 14. Current detector 12 corresponds to an embodiment of "first current detector." Control circuit 14 corresponds to an embodiment of "first control circuit."

Converter 4 is controlled by control circuit 14, and converts AC power supplied from commercial AC power supply 30 into DC power and outputs the DC power to DC line 6 when AC power is being supplied normally from commercial AC power supply 30 (in a sound state of commercial AC power supply 30). When the supply of AC power from commercial AC power supply 30 is stopped (at the time of a power failure of commercial AC power supply 30), the operation of converter 4 is stopped.

DC line 6 is connected to converter 4, bidirectional chopper 7 and inverter 8. A DC voltage VD that appears on DC line 6 is detected by control circuit 14. In a sound state of commercial AC power supply 30, control circuit 14 controls converter 4 such that DC voltage VD output from converter 4 becomes a reference DC voltage VDr.

Capacitor 5 is connected to DC line 6, and smooths and stabilizes DC voltage VD on DC line 6. A resistive element is connected in parallel with capacitor 5. The resistive element is provided to reduce DC voltage VD when power module P fails, to protect a user of uninterruptible power supply apparatus 100. A resistance value of the resistive element is set such that terminal-to-terminal voltage VD of capacitor 5 can reduced to 0 V in a short time when the operation of converter 4 is stopped.

Bidirectional chopper 7 has a high-voltage side node connected to DC line 6, and a low-voltage side node connected to battery terminal T2 through switch S2. Bidirectional chopper 7 is controlled by control circuit 14. In a sound state of commercial AC power supply 30, bidirectional chopper 7 stores DC power generated by converter 4 in battery 32. At the time of a power failure of commercial AC power supply 30, bidirectional chopper 7 supplies DC power of battery 32 to inverter 8. Switch S2 is turned on when power module P is in use, and is turned off during maintenance of battery 32, for example.

Control circuit 14 receives the signal indicating the detected value of battery voltage VB from control circuit 28 through communication line 15. In a sound state of commercial AC power supply 30, control circuit 14 controls bidirectional chopper 7 such that battery voltage VB becomes a reference battery voltage VBr. At the time of a power failure of commercial AC power supply 30, control circuit 14 controls bidirectional chopper 7 such that DC voltage VD on DC line 6 becomes reference DC voltage VDr.

Inverter 8 is controlled by control circuit 14, and in a sound state of commercial AC power supply 30, converts DC power generated by converter 4 into AC power with a commercial frequency. At the time of a power failure of commercial AC power supply 30, inverter 8 converts DC power supplied from battery 32 through bidirectional chopper 7 into AC power with a commercial frequency.

Reactor 9 has a first terminal connected to an output node of inverter 8, and a second terminal connected to output terminal T3 through switch S3. Capacitor 10 is connected to the second terminal of reactor 9. Capacitor 10 and reactor 9 constitute an AC filter 11.

AC filter 11 is a low pass filter, allows an AC current with a commercial frequency to flow from inverter 8 toward load 31, and prevents a signal with a switching frequency generated at inverter 8 from flowing toward load 31. In other words, AC filter 11 converts a rectangular wave voltage output from inverter 8 into a sinusoidal voltage.

Current detector 13 detects a current (an output current from inverter 8) I2 flowing from power module P to load 31, and provides a signal φI2 indicating the detected value to control circuit 14. Current detector 13 corresponds to an embodiment of "second current detector."

Switch S3 is controlled by control circuit 14. Control circuit 14 turns on switch S3 when a corresponding power module P should be put into operation, and turns off switch S3 when corresponding power module P should be stopped.

Control circuit 14 can be configured as a microcomputer, for example. As an example, control circuit 14 contains a memory and a CPU, which are not shown in the figure, and can perform control operations described below by software processing in which the CPU executes a program prestored in the memory. Alternatively, some or all of the control operations can be implemented by hardware processing using built-in dedicated electronic circuitry and the like, instead of by the software processing.

Control circuit 14 is connected to control circuit 14 of each of the other power modules P and control circuit 28 of bypass module B0 by communication line 15, and exchanges information with control circuit 14 of each of the other power modules P and control circuit 28 of bypass module B0. The plurality of control circuits 14 included in the plurality of power modules P1 to Pn and control circuit 28 constitute one controller that controls uninterruptible power supply apparatus 100. In the following description, when viewed from each control circuit 14, a power module P to which this control circuit 14 belongs may be referred to as a "corresponding device," and when viewed from each control circuit 14, power modules P to which this control circuit 14 does not belong may be referred to as "other devices."

In each power module P, control circuit 14 receives the signals indicating the detected values of AC voltage VI, battery voltage VB and AC voltage VO from control circuit 28 through communication line 15. Control circuit 14 controls a corresponding power module P based on these received signals, output signals φI1 and φI2 from current detectors 12 and 13, the detected value of DC voltage VD, and the like.

Specifically, control circuit 14 determines, based on the signal indicating the detected value of AC voltage VI, whether commercial AC power supply 30 is in a sound state or a power failure of commercial AC power supply 30 has occurred. In a sound state of commercial AC power supply 30, control circuit 14 controls converter 4 and inverter 8 in synchronization with AC voltage VI, based on the signals indicating the detected values of AC voltages VI and VO and the detected value of DC voltage VD. Control circuit 14 also controls bidirectional chopper 7 based on the signal indicating the detected value of battery voltage VB.

At the time of a power failure of commercial AC power supply 30, on the other hand, control circuit 14 controls inverter 8 and bidirectional chopper 7 based on the signal indicating the detected value of AC voltage VO, the signal indicating the detected value of battery voltage VB, the detected value of DC voltage VD, and the like.

As shown in FIG. 2, in uninterruptible power supply apparatus 100 according to the present embodiment, instantaneous values of AC voltage VI supplied to input terminal T1 of each power module P, battery voltage VB provided to battery terminal T2, and AC voltage VO that appears on output terminal T3 are detected by voltage detectors 22, 24 and 26 disposed in bypass module B0, respectively. Control circuit 28 of bypass module B0 transmits the signals indicating the detected values of AC voltages VI and VO and battery voltage VB to control circuit 14 of each power module P through communication line 15. Control circuit 14 of each power module P controls the corresponding device based on the received signals.

That is, voltage detectors 22, 24 and 26 are shared among the plurality of power modules P1 to Pn. This can reduce the number of voltage detectors disposed in each power module P, thereby reducing the size and cost of power module P. As a result, size and cost reductions of uninterruptible power supply apparatus 100 can be achieved.

In the configuration described above, the voltage detector for detecting DC voltage VD that appears on DC line 6 in each power module P is not shared among the plurality of power modules P1 to Pn, but is disposed in each power module P. This is to implement hot swap that allows power module P to be replaced while power feed by uninterruptible power supply apparatus 100 is continued.

More specifically, during the replacement of a power module P, the operation of this power module P is stopped while the other power modules P are maintained in operation. At this time, in this power module P, the operation of converter 4 is stopped to reduce DC voltage VD to 0 V. Accordingly, DC voltage VD in this power module P has a different value from those of DC voltages VD in the other power modules P in operation. Since DC voltage VD varies with each power module P in this manner, the voltage detector for detecting DC voltage VD is not shared among the plurality of power modules P1 to Pn.

Figure 3:
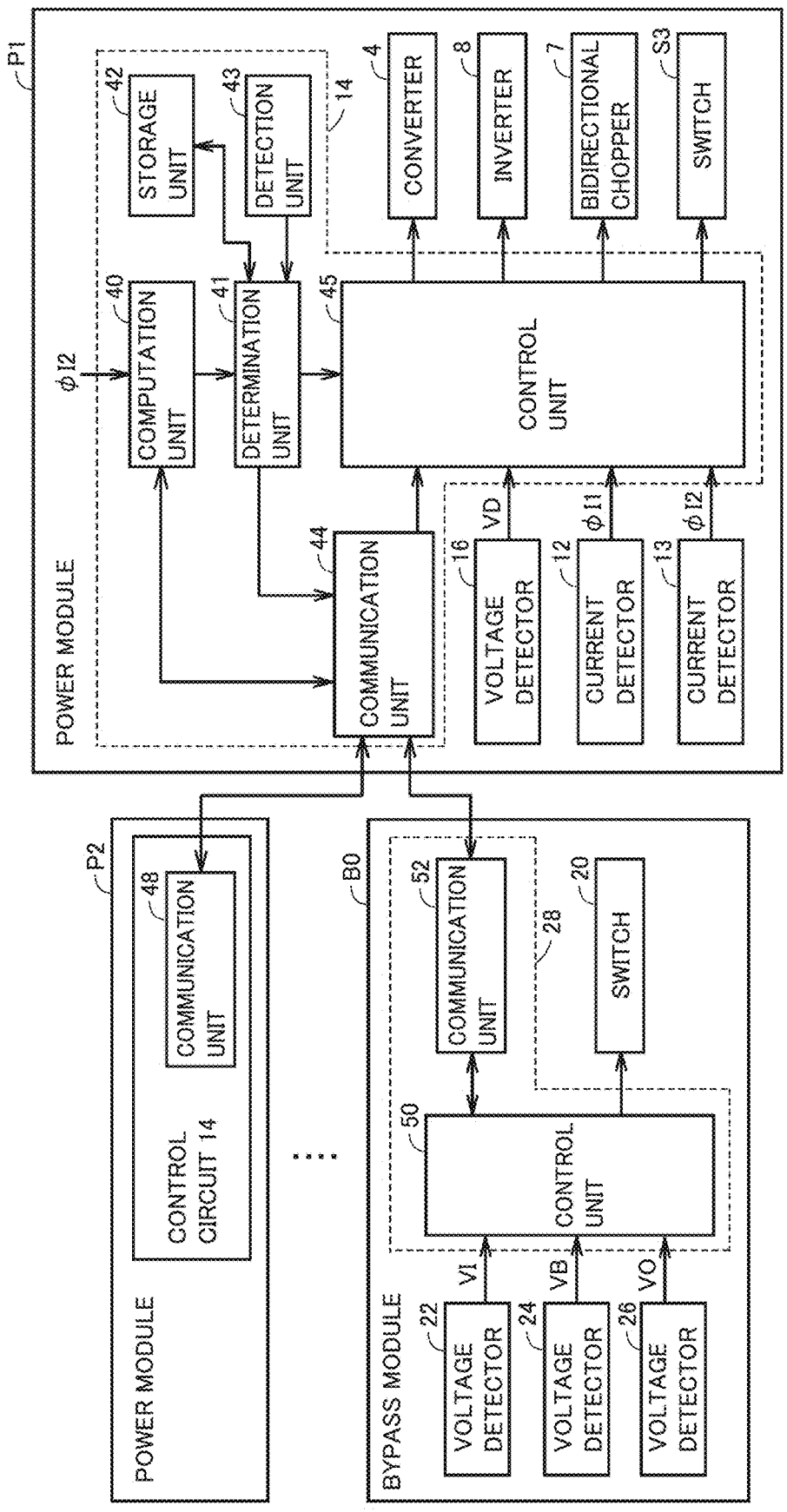
FIG. 3 is a diagram schematically showing functional configurations of control circuits of the bypass module and the power modules.

FIG. 3 is a diagram schematically showing functional configurations of control circuit 28 and control circuits 14.

As shown in FIG. 3, control circuit 28 has a control unit 50 and a communication unit 52. Communication unit 52 is connected to control circuits 14 of power modules P1 to Pn by communication line 15.

Control unit 50 transmits signals indicating detected values from voltage detectors 22, 24 and 26 to control circuits 14 of power modules P1 to Pn through communication unit 52. Control unit 50 receives, from control circuit 14 of each of power modules P1 to Pn through communication unit 52, a failure detection signal indicating occurrence of a failure of the corresponding device, and a signal indicating a minimum number Nmin of operating power modules P required to at least supply power to load 31.

Control unit 50 turns off switch 20 in the inverter power feed mode, and turns on switch 20 in the bypass power feed mode. The user of uninterruptible power supply apparatus 100 can operate an operation unit not shown in the figure, to select one of the bypass power feed mode and the inverter power feed mode.

However, if the number of power modules P available for operation falls below minimum number Nmin of operating power modules P due to a failure of at least one power module P in the inverter power feed mode, control unit 50 turns on switch 20 and supplies AC power from commercial AC power supply 30 to load 31.

Control circuit 14 has a computation unit 40, a determination unit 41, a storage unit 42, a detection unit 43, a communication unit 44, and a control unit 45. Computation unit 40 transmits output signal ϕl2 from current detector 13 of the corresponding device to control circuits 14 of the (n−1) other devices through communication unit 44 and communication line 15. Computation unit 40 receives output signals ϕl2 from current detectors 13 of the (n−1) other devices through communication unit 44. Computation unit 40 determines a number N of currently operating power modules P based on output signals ϕl2 from n current detectors 13, and provides determined number N of operating power modules P to determination unit 41.

Computation unit 40 also determines, based on output signals ϕl2 from n current detectors 13, a total value of output currents from inverters 8 of n power modules P1 to Pn, that is, a load current IL supplied from power modules P1 to Pn to load 31. Computation unit 40 determines a minimum number Nmin of operating power modules P required to at least supply load current IL. Computation unit 40 adds a redundant number Nr of operating power modules P (for example, one) to determined minimum number Nmin of operating power modules P, to determine an appropriate number Ns of operating power modules P. Computation unit 40 provides determined appropriate number Ns of operating power modules P to determination unit 41.

Appropriate number Ns of operating power modules P, which was determined by adding redundant number Nr of operating power modules P to minimum number Nmin of operating power modules P in this manner, is operated. Accordingly, when one power module P fails, failed power module P can be replaced while power feed to load 31 is continued by minimum number Nmin of operating power modules P.

Storage unit 42 stores a priority order in which power modules P1 to Pn are put into operation. The priority order is set, for example, in the numerical order of power modules P. The user of uninterruptible power supply apparatus 100 can operate the operation unit to write the priority order into storage unit 42.

Detection unit 43 detects whether or not a failure of the corresponding device has occurred, and outputs a failure detection signal when a failure of the corresponding device occurs.

Based on number N of currently operating power modules P and appropriate number Ns of operating power modules P determined by computation unit 40, the failure detection signal from detection unit 43, and the priority order of operation stored in storage unit 42, determination unit 41 determines whether the corresponding device should be put into operation or stopped, and provides a signal indicating the determination result to control unit 45. Determination unit 41 also transmits the signal indicating the determination result and the failure detection signal to control circuits 14 of the other devices and control circuit 28 of bypass module B0 through communication unit 44.

When the failure detection signal is output from detection unit 43 of the corresponding device, determination unit 41 determines that the corresponding device should be stopped. When number N of currently operating power modules P is greater than appropriate number Ns of operating power modules P, determination unit 41 determines that number N of operating power modules P should be reduced. In this case, determination unit 41 determines whether the corresponding device should be stopped or put into operation based on the priority order of the corresponding device. When number N of currently operating power modules P is smaller than appropriate number Ns of operating power modules P, on the other hand, determination unit 41 determines that number N of operating power modules P should be increased. In this case, determination unit 41 determines whether the corresponding device should be put into operation or stopped based on the priority order of the corresponding device.

Communication unit 44 provides to control unit 45 the signals indicating the detected values of AC voltages VI and VO and battery voltage VB that were received from control circuit 28 of bypass module B0.

A voltage detector 16 detects DC voltage VD on DC line 6, and provides a signal indicating the detected value to control unit 45. Voltage detector 16 corresponds to an embodiment of "fourth voltage detector."

When it is determined by determination unit 41 that the corresponding device should be stopped, control unit 45 stops the operation of converter 4, inverter 8 and bidirectional chopper 7 of the corresponding device, and turns off switch S3.

When it is determined by determination unit 41 that the corresponding device should be put into operation, on the other hand, control unit 45 operates converter 4, inverter 8 and bidirectional chopper 7 of the corresponding device, and turns on switch S3. At this time, based on the signal indicating the detected value of AC voltage VI provided from communication unit 44, the output signal from voltage detector 16, and output signal ϕI1 from current detector 12, control unit 45 controls converter 4 such that DC voltage VD output from converter 4 becomes reference DC voltage VDr. In addition, based on the signals indicating the detected values of AC voltages VI and VO provided from communication unit 44 and output signal ϕI2 from current detector 13, control unit 45 controls inverter 8 in synchronization with AC voltage VI from commercial AC power supply 30, and generates AC voltage VO with a commercial frequency. Further, based on the signal indicating the detected value of battery voltage VB provided from communication unit 44, control unit 45 controls bidirectional chopper 7 such that battery voltage VB becomes reference battery voltage VBr.

In addition, based on output signals ϕI2 from current detectors 13 of power modules P1 to Pn, control unit 45 determines number N of currently operating power modules P, and the total value of output currents from inverters 8 of power modules P1 to Pn, that is, load current IL. Control unit 45 then determines a share current ID=IL/N of the corresponding device, and controls converter 4 and inverter 8 of the corresponding device such that output current I2 from inverter 8 becomes share current ID.

In addition, based on the signal indicating the detected value of AC voltage VI provided from communication unit 44, control unit 45 determines whether or not AC voltage VI is being supplied normally from commercial AC power supply 30. When AC voltage VI is lower than a lower limit value, control unit 45 determines that AC voltage VI is not being supplied normally and a power failure has occurred, and stops the operation of converter 4. Further, based on the signal indicating the detected value of battery voltage VB provided from communication unit 44, control unit 45 determines whether or not DC power of battery 32 has fallen below a lower limit value. When it is determined that DC power of battery 32 has fallen below the lower limit value, control unit 45 stops the operation of inverter 8 and turns off switch S3.

The determination of whether or not AC voltage VI is being supplied normally from commercial AC power supply 30, and the determination of whether or not DC power of battery 32 has fallen below the lower limit value may be performed by control circuit 28 of bypass module B0 based on the output signal from voltage detector 22, and signals indicating the determination results may be transmitted to control circuit 14 of each power module P through communication line 15.

Figure 4:
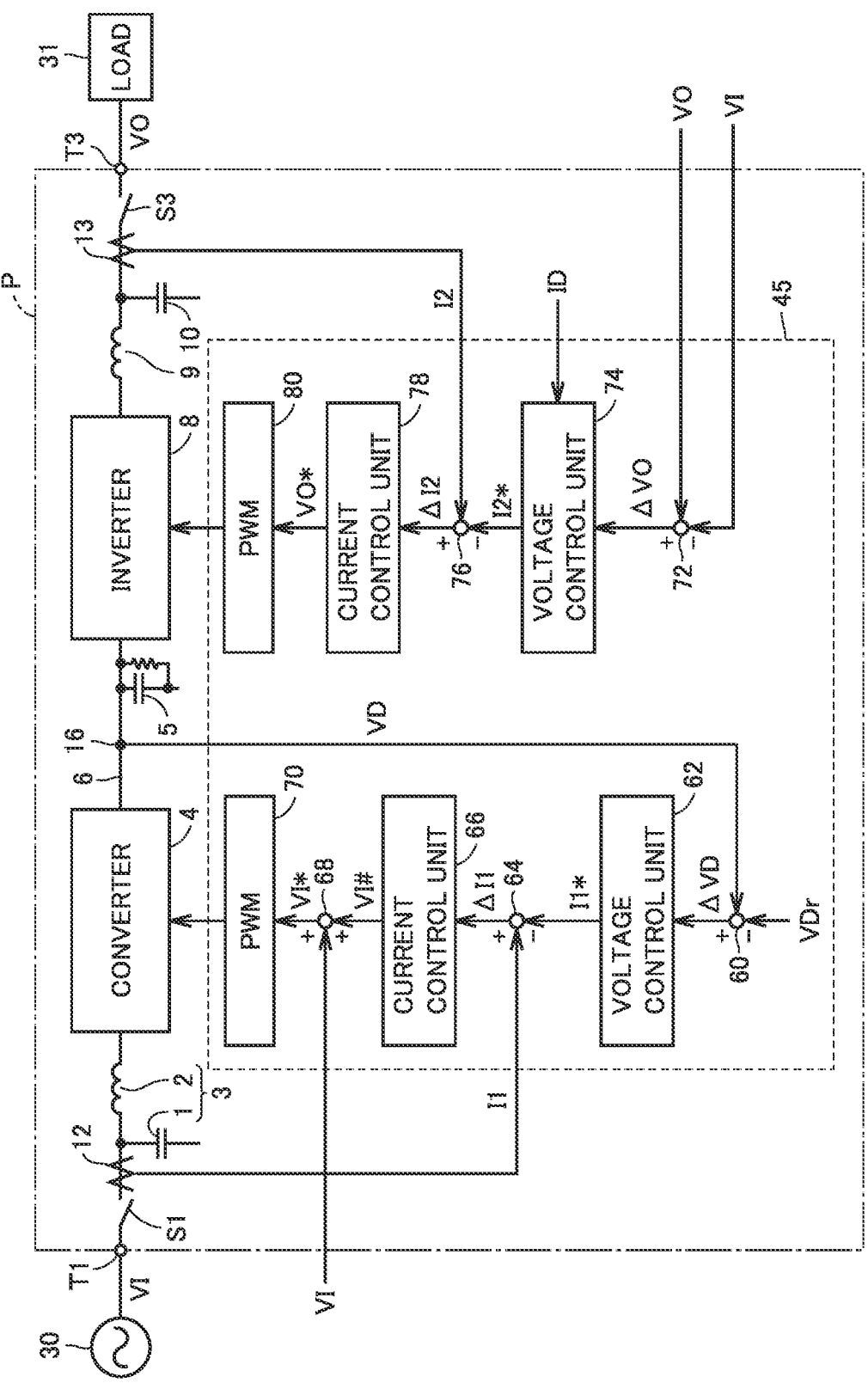
FIG. 4 is a functional block diagram of a control unit shown in FIG. 3.

FIG. 4 is a functional block diagram of control unit 45 shown in FIG. 3.

As shown in FIG. 4, control unit 45 has a converter control unit for controlling converter 4, and an inverter control unit for controlling inverter 8.

The converter control unit includes subtractors 60 and 64, a voltage control unit 62, a current control unit 66, an adder 68, and a PWM circuit 70. Subtractor 60 calculates a deviation ΔVD between reference DC voltage VDr and the detected value of DC voltage VD from voltage detector 16. Voltage control unit 62 calculates a current command value I1* for controlling current I1 that flows into converter 4, such that deviation ΔVD becomes zero. Voltage control unit 62 calculates current command value I1* by, for example, performing a proportional computation or a proportional integral computation of deviation ΔVD.

Subtractor 64 calculates a deviation ΔI1 between current command value I1* and the detected value of current I1 from current detector 12. Current control unit 66 calculates a voltage command value VI#, as a voltage to be applied to reactor 2 such that deviation ΔI1 becomes zero. Current control unit 66 calculates voltage command value VI# by, for example, performing a proportional computation or a proportional integral computation of deviation ΔI1.

Adder 68 adds voltage command value VI# and the detected value of AC voltage VI provided from communication unit 44 together, to generate a voltage command value VI*. Based on voltage command value VI*, PWM circuit 70 outputs a signal for causing the detected value of AC voltage VI provided from communication unit 44 to be equal to voltage command value VI*. This signal is a signal for driving a semiconductor switching element included in converter 4.

The inverter control unit includes subtractors 72 and 76, a voltage control unit 74, a current control unit 78, and a PWM circuit 80. Subtractor 72 calculates a deviation ΔVO between the detected value of AC voltage VI provided from communication unit 44 and the detected value of AC voltage VO provided from communication unit 44. Voltage control unit 74 calculates a current command value I2# for controlling output current I2 from inverter 8, such that deviation ΔVO becomes zero. Voltage control unit 74 generates a current command value I2* based on current command value I2# and share current ID of the corresponding device.

Subtractor 76 calculates a deviation ΔI2 between current command value I2* and the detected value of current I2 from current detector 13. Current control unit 78 calculates a voltage command value VO*, as a voltage to be output from inverter 8 such that deviation ΔI2 becomes zero. Current control unit 78 calculates voltage command value VO* by, for example, performing a proportional computation or a proportional integral computation of deviation ΔI2.

Based on voltage command value VO*, PWM circuit 80 outputs a signal for causing the detected value of AC voltage VO provided from communication unit 44 to be equal to voltage command value VO*. This signal is a signal for driving a semiconductor switching element included in inverter 8.

As described above, uninterruptible power supply apparatus 100 according to the present embodiment is a modular uninterruptible power supply apparatus, and includes the plurality of power modules P1 to Pn and bypass module B0 connected in parallel between commercial AC power supply 30 and load 31. Bypass module B0 has voltage detectors 22, 24 and 26 for detecting AC voltage VI applied to input terminal T1 of each power module P, battery voltage VB applied to battery terminal T2, and AC voltage VO output to output terminal T3, respectively. Control circuit 28 of bypass module B0 transmits the signals indicating the detected values from voltage detectors 22, 24 and 26 to control circuit 14 of each power module P through communication line 15.

With such a configuration in which voltage detectors 22, 24 and 26 for detecting the voltages required to control converter 4, inverter 8 and bidirectional chopper 7 included in each power module P are disposed in bypass module B0, and voltage detectors 22, 24 and 26 are shared among the plurality of power modules P1 to Pn, the number of voltage detectors disposed in each power module P can be reduced, whereby the size and cost of power module P can be reduced. Accordingly, size and cost reductions of uninterruptible power supply apparatus 100 can be achieved.

Further, according to the configuration described above, since control circuit 14 of each power module P controls converter 4, bidirectional chopper 7 and inverter 8 using the voltage detected values shared among the plurality of power modules P1 to Pn, operation variation among the plurality of power modules P1 to Pn can be suppressed. For example, the occurrence of a cross current among output terminals T3 of the plurality of power modules P1 to Pn due to variation in output voltages VO from inverters 8 of the plurality of power modules P can be suppressed.

In the configuration described above, voltage detector 16 for detecting DC voltage VD that appears on DC line 6 of each power module P is not shared among the plurality of power modules P1 to Pn, but is disposed in each power module P. Accordingly, hot swap can be implemented that allows power module P to be replaced while power feed by uninterruptible power supply apparatus 100 is continued.

It should be understood that the embodiment disclosed herein is illustrative and non-restrictive in every respect. The present disclosure is defined by the terms of the claims, rather than the description above, and is intended to include any modifications within the scope and meaning equivalent to the terms of the claims.

REFERENCE SIGNS LIST

4 converter; 1, 5, 10 capacitor; 2, 9 reactor; 3, 11 AC filter; 6 DC line; 7 bidirectional chopper; 8 inverter; 12, 13 current detector; 14, 28 control circuit; 15 communication line; 16, 22, 24, 26 voltage detector; 20, S1 to S3 switch; 30 commercial AC power supply; 31 load; 32 battery (power storage device); 40 computation unit; 41 determination unit; 42 storage unit; 43 detection unit; 44, 52 communication unit; 45, 50 control unit; 60, 64, 72, 76 subtractor; 62, 74 voltage control unit; 66, 78 current control unit; 68 adder; 70, 80 PWM circuit; 100 uninterruptible power supply apparatus; B0 bypass module; P1 to Pn, P power module; T1, T11 input terminal; T2, T12 battery terminal; T3, T13 output terminal.

The invention claimed is:

1. An uninterruptible power supply apparatus comprising:
a plurality of power conversion modules connected in parallel between an AC power supply and a load; and
a bypass module connected between the AC power supply and the load, wherein
the plurality of power conversion modules are connected in parallel with a power storage device,
each of the power conversion modules includes
a first terminal that receives AC power from the AC power supply,
a second terminal connected to the power storage device,
a third terminal for outputting AC power to the load,
a converter that converts AC power received by the first terminal into DC power,
an inverter that converts DC power from the converter or the power storage device into AC power and supplies the AC power to the load, and
a first control circuit that controls the converter and the inverter, the bypass module includes
a first switch connected between the AC power supply and the load,
a first voltage detector that detects an AC voltage applied to the first terminal,
a second voltage detector that detects a DC voltage applied to the second terminal,
a third voltage detector that detects an AC voltage applied to the third terminal, and
a second control circuit that controls ON/OFF of the first switch,
the second control circuit is communicatively connected to the first control circuit, and transmits detection results from the first to third voltage detectors to the first control circuit, and
the first control circuit controls the converter and the inverter by using the detection results from the first to third voltage detectors that are transmitted from the second control circuit.

2. The uninterruptible power supply apparatus according to claim 1, wherein
each of the power conversion modules further includes
a fourth voltage detector that detects a DC voltage on a DC line connected to the converter and the inverter,
a first current detector that detects an input current to the converter, and
a second current detector that detects an output current from the inverter, and
the first control circuit controls the converter and the inverter by using the detection results from the first to third voltage detectors that are transmitted from the second control circuit, a detection result from the fourth voltage detector, and detection results from the first and second current detectors.

3. The uninterruptible power supply apparatus according to claim 2, wherein
each of the power conversion modules further includes a bidirectional chopper that exchange DC power between the power storage device and the DC line, and
the first control circuit controls the bidirectional chopper by using the detection result from the fourth voltage detector, and the detection result from the second voltage detector that is transmitted from the second control circuit.

4. The uninterruptible power supply apparatus according to claim 1, wherein
- each of the power conversion modules further includes a second switch connected between the inverter and the third terminal, and
- when a corresponding one of the power conversion modules should be stopped, the first control circuit stops operation of the converter and the inverter and turns off the second switch.

5. The uninterruptible power supply apparatus according to claim 2, wherein
- each of the power conversion modules further includes a second switch connected between the inverter and the third terminal, and
- when a corresponding one of the power conversion modules should be stopped, the first control circuit stops operation of the converter and the inverter and turns off the second switch.

6. The uninterruptible power supply apparatus according to claim 3, wherein
- each of the power conversion modules further includes a second switch connected between the inverter and the third terminal, and
- when a corresponding one of the power conversion modules should be stopped, the first control circuit stops operation of the converter and the inverter and turns off the second switch.

* * * * *